US011058064B2

(12) United States Patent
Combs, III

(10) Patent No.: US 11,058,064 B2
(45) Date of Patent: Jul. 13, 2021

(54) LOADER SAW ATTACHMENT DEVICE AND METHODS OF MAKING AND USING THE SAME

(71) Applicant: Treefrogg LLC, Moyock, NC (US)

(72) Inventor: Norman Dean Combs, III, Mechanicsville, VA (US)

(73) Assignee: Treefrogg LLC, Moyock, NC (US)

( * ) Notice: Subject to any disclaimer, the term of this patent is extended or adjusted under 35 U.S.C. 154(b) by 0 days.

(21) Appl. No.: 16/942,143

(22) Filed: Jul. 29, 2020

(65) Prior Publication Data

US 2021/0029889 A1     Feb. 4, 2021

Related U.S. Application Data

(60) Provisional application No. 62/879,558, filed on Jul. 29, 2019.

(51) Int. Cl.
| | |
|---|---|
| *A01G 3/08* | (2006.01) |
| *A01B 63/10* | (2006.01) |
| *A01B 63/02* | (2006.01) |
| *A01G 23/095* | (2006.01) |

(52) U.S. Cl.
CPC ............. *A01G 3/088* (2013.01); *A01B 63/02* (2013.01); *A01B 63/10* (2013.01); *A01G 23/095* (2013.01)

(58) Field of Classification Search
CPC .... A01G 3/0426; A01G 3/088; A01G 23/095; A01B 63/02; A01B 63/10; B27B 5/10
USPC ....... 144/4.1, 34.1–34.6; 56/10.1, 10.6–10.9, 56/14.7, 235, 295; 83/471.1, 928; 30/379, 379.5
See application file for complete search history.

(56) References Cited

U.S. PATENT DOCUMENTS

| | | | | | |
|---|---|---|---|---|---|
| 2,299,129 | A | * | 10/1942 | Dickenson, Jr. ..... | A01G 3/0426 30/379 |
| 2,694,421 | A | * | 11/1954 | Shrewsbury .............. | B27B 5/10 30/379 |
| 3,032,956 | A | * | 5/1962 | Mullet ................. | A01G 3/0426 30/379 |
| 3,343,575 | A | * | 9/1967 | Trout ........................ | B27B 5/10 144/34.1 |
| 3,482,611 | A | * | 12/1969 | Hamilton ............. | A01G 23/097 144/4.1 |
| 3,487,864 | A | * | 1/1970 | Larson et al. ......... | A01G 23/085 144/4.1 |
| 3,799,016 | A | * | 3/1974 | McVaugh ................ | H02G 1/08 83/928 |

(Continued)

*Primary Examiner* — Jason Daniel Prone
(74) *Attorney, Agent, or Firm* — NK Patent Law

(57) ABSTRACT

Disclosed herein are devices, methods, and methods of making devices for solving the problem of providing vegetation maintenance along easements, right-of-ways, roads, paths, and landscapes. In one embodiment, a saw attachment includes a boom assembly and a motor assembly mechanically coupled with the boom assembly. The saw attachment also includes a circular saw blade mechanically coupled with the motor assembly and a mount assembly mechanically coupled with the boom assembly. The mount assembly is configured for attachment to a loader having lift arms and resident on a host vehicle. In certain embodiments, the host vehicle may be a skid-steer, a tracked loader, or the like. In other embodiments, the host vehicle may be a tractor, a telehandler, or the like.

16 Claims, 10 Drawing Sheets

(56) References Cited

U.S. PATENT DOCUMENTS

| | | | | |
|---|---|---|---|---|
| 4,063,359 A * | 12/1977 | Luscombe | A01G 3/08 30/379.5 |
| 4,269,241 A * | 5/1981 | Hickman | A01G 3/08 30/379.5 |
| 4,411,070 A * | 10/1983 | Boyum | B27B 5/10 30/379.5 |
| 4,703,612 A * | 11/1987 | Webster | A01D 78/146 56/11.9 |
| 4,728,249 A * | 3/1988 | Gano | E02F 3/286 212/348 |
| 4,802,327 A * | 2/1989 | Roberts | A01D 34/866 56/295 |
| 4,813,142 A * | 3/1989 | Manno | B27B 5/10 144/34.1 |
| 4,946,488 A * | 8/1990 | Davison | A01G 23/093 56/255 |
| 5,174,098 A * | 12/1992 | Emery | A01G 23/091 30/379.5 |
| 5,201,350 A * | 4/1993 | Milbourn | A01G 23/091 144/34.1 |
| 5,396,754 A * | 3/1995 | Fraley | A01D 34/863 56/15.2 |
| 5,430,999 A * | 7/1995 | Grant | B27B 5/10 56/11.9 |
| 5,511,368 A * | 4/1996 | Kocher | A01D 34/866 56/DIG. 14 |
| 5,537,808 A * | 7/1996 | Dallman | A01D 34/73 56/15.2 |
| 5,950,699 A * | 9/1999 | Dove | A01G 3/00 144/34.1 |
| 6,085,505 A * | 7/2000 | Edwards | A01G 3/0426 56/15.2 |
| 6,311,746 B1 * | 11/2001 | Halvorson | A01G 3/08 144/4.1 |
| 6,662,835 B1 * | 12/2003 | Gengler | A01G 23/091 144/34.1 |
| 7,152,640 B1 | 12/2006 | Williams | |
| 7,367,368 B2 | 5/2008 | Smitherman | |
| 7,418,985 B2 | 9/2008 | Torgersen | |
| 8,096,334 B2 * | 1/2012 | Milne | A01G 23/08 144/4.1 |
| 9,220,204 B2 * | 12/2015 | Capers | A01G 3/086 |
| 9,591,812 B2 * | 3/2017 | Schmotter | B27B 5/10 |
| 9,790,967 B2 * | 10/2017 | Schmotter | B27B 5/10 |
| 10,144,145 B1 * | 12/2018 | Capers | A01G 23/095 |
| 10,378,561 B2 * | 8/2019 | Schmotter | B27B 5/10 |
| 10,412,900 B2 * | 9/2019 | West | A01G 23/095 |
| 2008/0066827 A1 | 3/2008 | Torgersen | |
| 2010/0018514 A1 * | 1/2010 | Wills, II | B27B 5/10 30/379.5 |
| 2018/0338421 A1 | 11/2018 | Christian | |

* cited by examiner

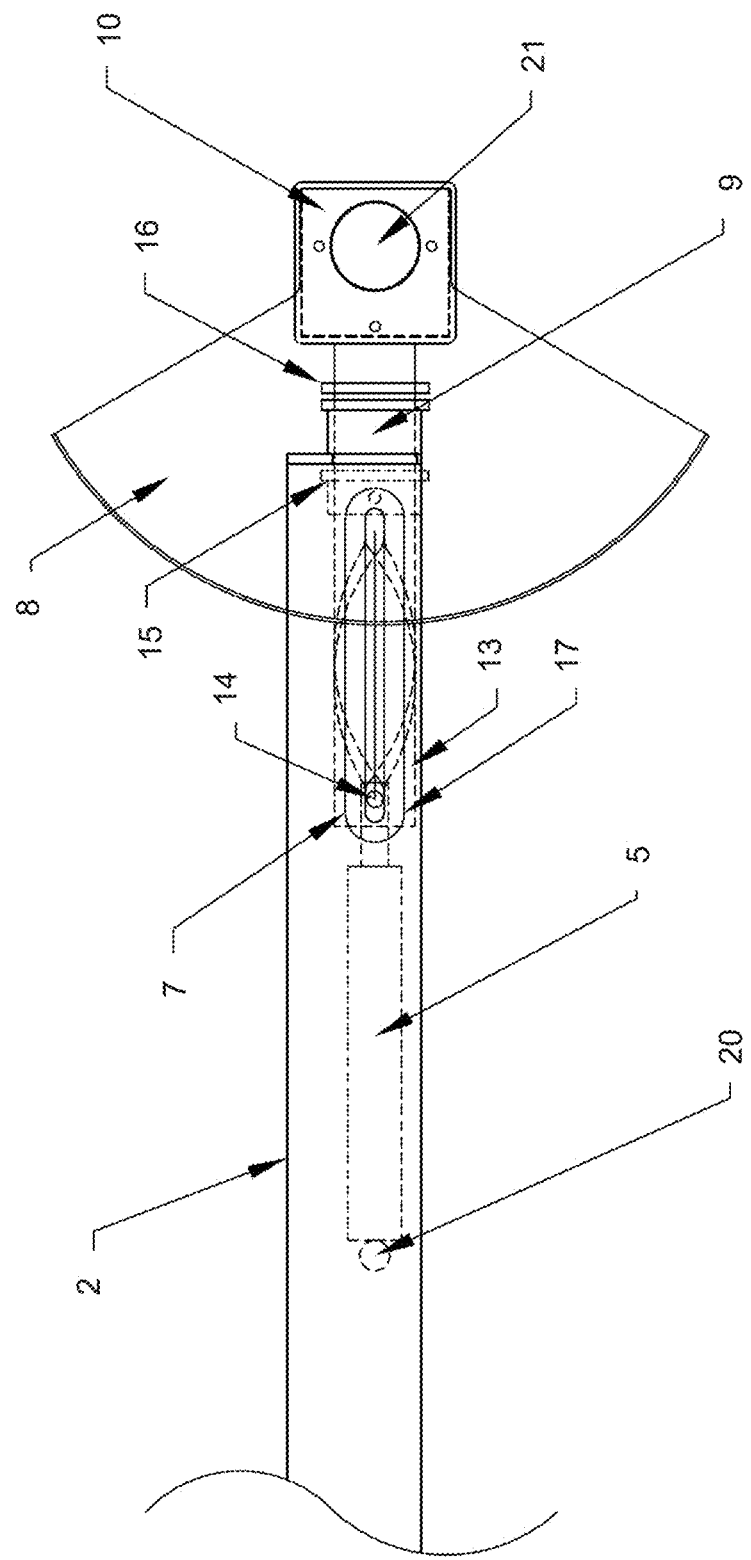

LOADER SAW ATTACHMENT DEVICE AND METHODS OF MAKING AND USING THE SAME

PRIORITY CLAIM

This application claims priority to U.S. Provisional Patent Application Ser. No. 62/879,558 filed Jul. 29, 2019, the disclosure of which is incorporated herein by reference in its entirety.

TECHNICAL FIELD

The present invention relates generally to skid-steers and tracked loaders, and more specifically to saw attachments for skid-steers and tracked loaders for vegetation maintenance.

BACKGROUND

Overhanging tree limbs and other vegetation along easements, right-of-ways, roads, paths, and landscapes can be tedious, time consuming, and expensive to maintain. Often property owners are responsible for easements and right-of-ways that allow access for maintenance personnel. Transmission lines have border zones that must be maintained on each side from trees and other incompatible vegetation. Vegetation also has to remain clear of road signs and corners around intersections that may affect a driver's visibility.

Maintenance of this vegetation often requires handheld devices (e.g. chainsaws) and/or large expensive vehicles (e.g. bucket trucks, etc.) to be able to reach the overgrown limbs and vegetation. Many of these maintenance practices place workers in a danger zone of falling debris and/or at risk for injury from use of handheld saws, hand climbing, and/or use of bucket trucks. Additionally some areas are too narrow and/or confined for a bucket truck. Costs associated with equipment and personnel for such maintenance can also be high.

As such better methods and devices are needed to perform vegetation maintenance along easements, right-of-ways, roads, paths, and landscapes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are devices, methods, and methods of making devices for solving the problem of providing vegetation maintenance along easements, right-of-ways, roads, paths, and landscapes. In one embodiment, a saw attachment includes a boom assembly and a motor assembly mechanically coupled with the boom assembly. The saw attachment also includes a circular saw blade mechanically coupled with the motor assembly and a mount assembly mechanically coupled with the boom assembly. The mount assembly is configured for attachment to a loader having lift arms and resident on a host vehicle. In certain embodiments, the host vehicle may be a skid-steer, a tracked loader, or the like. In other embodiments, the host vehicle may be a tractor, a telehandler, or the like.

In some embodiments, the saw attachment may be configured for a forward reach between twelve feet and eighteen feet. The saw attachment may also be configured for a vertical reach of at least twenty feet beyond the loader. The circular saw blade has a diameter of approximately twenty-four inches and may be configured for a cutting capacity of approximately eight inches. The circular saw blade may be mechanically coupled with the motor assembly using a keyed shaft and hub assembly secured by a tabbed and keyed lock washer and retaining nut. In other embodiments, the circular saw blade may be mechanically coupled with the motor assembly using an arbor nut and a clamping washer.

In some embodiments, the motor assembly may be configured for a rotation of at least 3000 revolutions-per-minute (rpm). The motor assembly may include a gerotor hydraulic motor, an overhung load adapter mechanically coupled with the gerotor hydraulic motor, and a blade hub mechanically coupled with the overhung load adapter.

In some embodiments, the boom assembly may include a first hydraulic cylinder mechanically configured to provide a telescoping function for the boom assembly. The boom assembly may also include a second hydraulic cylinder mechanically configured to provide a rotation of at least 120 degrees of the motor assembly about a center axis of the boom assembly. The boom assembly may further include a helically grooved cylinder mechanically coupled between the second hydraulic cylinder and the motor assembly to provide the rotation of at least 120 degrees of the motor assembly. The saw motor assembly may also be configured to be manually clocked at least 340 degrees around about the center axis of the boom assembly in addition to the rotation of at least 120 degrees of the motor assembly provided by the second hydraulic cylinder. In other embodiments, the additional rotation may be at least 180 degrees. In still other embodiments, the additional rotation may be at least 360 degrees.

In some embodiments, the saw attachment may include an operator interface configured for mounting in the host vehicle. The saw attachment may further include a priority flow diverter valve and solenoid directional control valves electrically coupled with the operator interface and hydraulically coupled with a first quick connect coupling assembly. The first quick connect coupling assembly may be configured for connection to an output port of a hydraulic system of the host vehicle.

The saw attachment may further include a priority flow divider hydraulic valve configured for controlling flow output supplying regulated flow to the gerotor hydraulic motor and a first directional control valve electrically coupled with the operator interface. The direction control valve may be hydraulically coupled with an excess flow output port of the priority flow diverter valve, a first port of the first hydraulic cylinder, and a second port of the first hydraulic cylinder;

The saw attachment may further include a second directional control valve electrically coupled with the operator interface. The second directional control value may be hydraulically coupled with an excess flow output port of the priority flow diverter valve, a first port of the second hydraulic cylinder, and a second port of the second hydraulic cylinder.

The saw attachment may further include a third directional control valve electrically coupled with the operator interface. The third directional control valve may be hydraulically coupled with a first port of the second hydraulic cylinder and a second port of the second hydraulic cylinder.

In some embodiments, the mount assembly may include an attachment plate configured for direct mechanical mounting to the loader. The attachment plate may be compliant to a universal attachment plate as specified by Society of Automotive Engineers (SAE) J2513 standard.

In another embodiment, a method is disclosed for providing vegetation maintenance along right-of-ways, roads, paths, and landscapes. The method includes installing a saw attachment having an operator interface on to a loader of a skid-steer or a tracked loader. The saw attachment includes a boom assembly and a motor assembly mechanically coupled with the boom assembly. The saw attachment also includes a circular saw blade mechanically coupled with the motor assembly and a mount assembly mechanically coupled with the boom assembly. The method also includes operating the saw assembly from within the host vehicle using the operator interface.

In another embodiment, a method of manufacturing a saw attachment for providing vegetation maintenance along right-of-ways, roads, paths, and landscapes. The method includes (1) mechanically assembling a boom assembly with a motor assembly, (2) mechanically assembling a boom assembly with a motor assembly, (3) mechanically assembling a circular saw blade with the motor assembly, and (4) mechanically assembling a mount assembly with the boom assembly. The mount assembly is configured for attachment to a loader having lift arms and resident on a host vehicle.

BRIEF DESCRIPTION OF THE DRAWINGS

The present embodiments are illustrated by way of example and are not intended to be limited by the figures of the accompanying drawings. In the drawings:

FIG. 2A and FIG. 2B depict mechanical diagrams illustrating more detailed views of a rotation actuator section of FIG. 1 in accordance with embodiments of the present disclosure.

DETAILED DESCRIPTION

Figure 1:
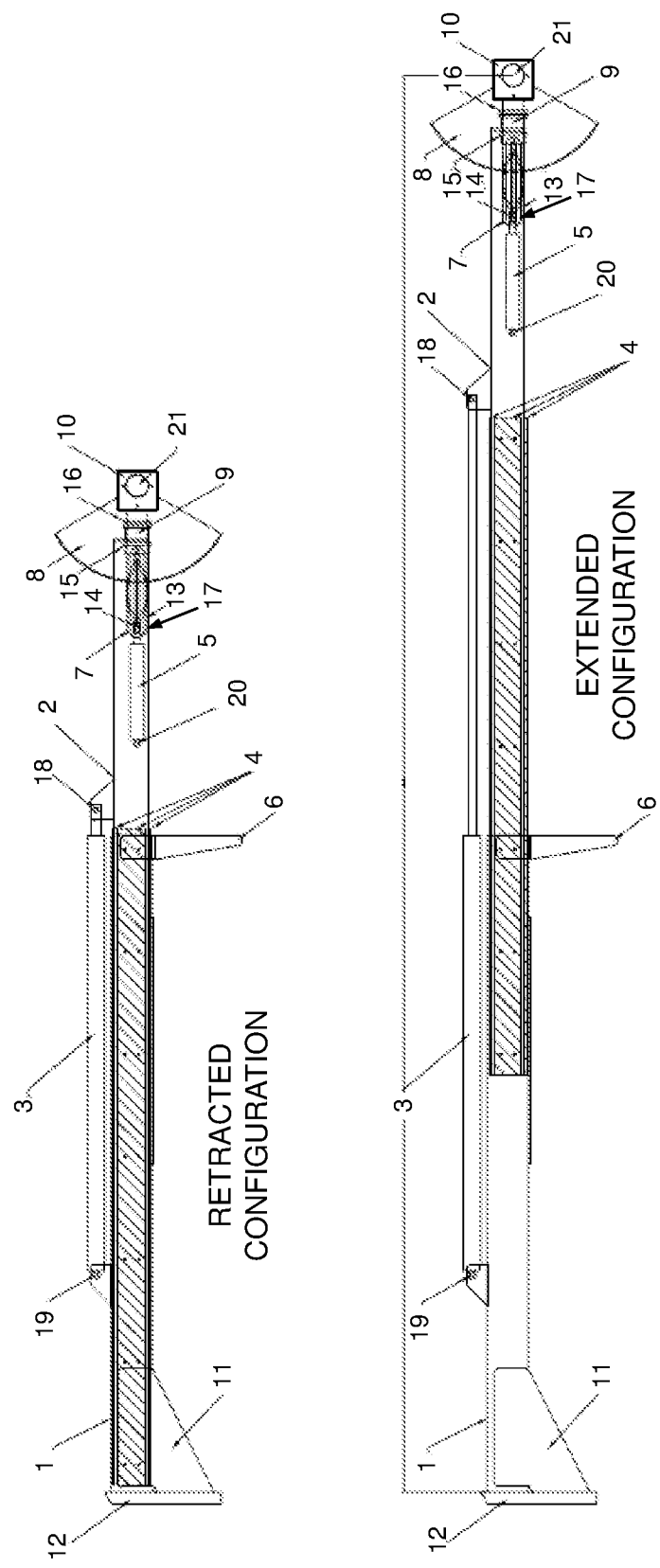
FIG. 1 depicts a mechanical diagram illustrating an extended configuration and a retracted configuration of a saw attachment for a host vehicle in accordance with embodiments of the present disclosure.

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Disclosed herein are saw attachments for host machines such as skid-steers and tracked loaders. For purposes of this disclosure, a skid-steer is a small four wheeled engine powered vehicle having a rigid frame and lift arms attached to a loader. A tracked loader is a similar vehicle with tracks replacing the wheels. The disclosed saw attachments provide cost effective, safe, and productive methods allowing an operator to trim high and low vegetation (e.g. trees, shrubs, etc.) using a self-propelled host machine. These host machines can easily access easements, right of ways, and off-highway locations. The saw attachments are easier to use and have much greater reach than a handheld pole saw. The saw attachments are also more powerful than a chainsaw and do not require climbing and/or use of a bucket truck to reach the vegetation. Additionally, no human (i.e. operator) parts are near the actual cutting apparatus providing for extra safety. The saw attachments when used with host machine provide a great reduction in manual labor over using a chainsaw via climbing and/or a bucket truck. The saw attachments have simple user controls that may be operated from inside comfort and safety of the cab of the host machine.

With the disclosed saw attachments, there is no reason to purchase a dedicated piece of equipment. After trimming vegetation, a saw attachment may be removed from the host machine and the host machine may then be used for other purposes. Many contractors, park services, and municipalities already own the host machines. Such saw attachments may garner a market value between $9000 and $25,000, wherein a dedicated host machine with the disclosed functionality may cost as much as $100,000 or more.

The saw attachments disclosed herein are powered by an auxiliary hydraulic circuit that is standard on most host machines. The saw attachments include a telescoping boom (i.e. boom assembly) with twelve to eighteen feet of forward reach and up to twenty-eight of vertical reach including the loader height of the host vehicle. All actions of the saw attachments are controlled by solenoid operated hydraulic valves. Hydraulic functionality includes metered flow rates when sawing and telescoping functions. The saw attachments also combine dead-man and boom support roller brackets for easier installation and removal from the host vehicle.

In certain embodiments the saw attachments include a 0.5 up to a 1.8 cubic inch gerotor hydraulic motor rated for 3500 revolution-per-minute (rpm) that is attached to a twenty-four inch carbide tipped rotating solid blade rated for a speed of 3000 rpm. The blade is designed for forestry applications and has an eight inch cutting capacity. By spinning at 3000 rpm, blade inertia provides a majority of cutting power per branch. The blade is locked to a hub and shaft by an arbor bolt with a clamping washer. An overhung load adapter is used to isolate radial and axial loads from motor output shaft. The overhung load adapter is rated for 4000 rpm with a 1.5 inch 8620 keyed output shaft machined to adapt to the blade hub.

The hydraulic system is designed for flow rates of twenty to twenty-five feet-per-second (fps) for supply side lines and ten to fifteen fps for return lines. All hydraulic hoses are sized using industry standard practices. Action speed is controlled by orifices inserted into the hydraulic fittings. A first two inch by sixty inch stroke double acting cylinder allows for a telescoping boom extension of five feet. A second 1.5 inch by 10 inch stroke double acting cylinder coupled with a helical cut shaft allows for saw head assembly rotation.

A priority flow control valve allows for adjustable hydraulic motor speed. Waste flow from the priority flow control valve is used for the first and second double action cylinders. A first D03 valve having a closed center controls action of the first double action cylinder for extending and retracting the boom. A second D05 valve having a closed center controls action of the second double action cylinder for rotation of the saw head assembly.

A priority flow divider hydraulic valve meters flow to the saw blade motor. A check valve between the supply and return lines on the motor allow the blade to free spool to a stop after the hydraulic source has been shut off and prevents damage to the saw attachment. The gerotor hydraulic motor also includes a case drain to bleed off housing fluid pressure. The motor return line is one size larger than the motor feed line and thus reduces backpressure. The hydraulic system includes a common tank return point with a check valve on the tank return to the host machine to prevent reverse operation (i.e. flow) of hydraulic fluid.

The saw attachments are designed using Design-for-Manufacturability (DFM) practices to further reduce cost of producing and thus increasing potential profit margins.

In other embodiments, the saw attachments may include a larger or smaller hydraulic motor with a larger or smaller rotating blade. The larger hydraulic motor provides increased torque for faster blade spooling. In certain embodiments, a Lylatrac® system, or the like, may be used to manage hydraulic hoses and control excess when the telescoping boom is not fully extended. The telescoping boom may also be rectangular thus allowing the telescope cylinder to be placed internal to the boom FIG. 1 depicts a mechanical diagram 100 illustrating an extended configuration and a retracted configuration of a first embodiment of a saw attachment for a host vehicle in accordance with embodiments of the present disclosure. Table I lists key components with label descriptors as referenced to FIG. 1.

TABLE I

| Label | Description |
|---|---|
| 1 | First Boom |
| 2 | Second Boom |
| 3 | Hydraulic Cylinder for Telescope function |
| 4 | Second Boom Polymer Slide Pads |
| 5 | Hydraulic Cylinder for Head Rotation |
| 6 | "Dead-Man" Support for Boom |
| 7 | Rotation Guide Pin Bracket |
| 8 | Blade Shield |
| 9 | Mounting Collar for Saw Head |
| 10 | Saw Head Motor Housing |
| 11 | Boom Support Gusset |
| 12 | Universal Attachment Plate |
| 13 | Helical Cut Shaft for Head Rotation |
| 14 | Rotation Pin |
| 15 | Rotation Shaft Internal Retention Collar |
| 16 | Rotation Shaft External Retention Collar |
| 17 | Rotation Cylinder Dynamic Pin Guide |
| 18 | Telescope Cylinder Piston Pin |

TABLE I-continued

| Label | Description |
|---|---|
| 19 | Telescope Cylinder Body Pin |
| 20 | Rotation Cylinder Body Pin |
| 21 | SAE "A" 2-Bolt Mounting in Blade Shield Bracket (8) |

A first boom (1), a second boom (2), and a hydraulic cylinder (3) are configured to provide a telescoping boom assembly. A piston pin (18) and a body pin (19) couple the hydraulic cylinder (3) with the first boom (1) and the second boom (2). Second boom polymer slide pads (4) are configured to allow smooth extension and retraction of the telescoping boom assembly. A universal attachment plate (12), a boom support gusset (11) coupled with the first boom (1) are configured to stabilized the telescoping boom assembly to a loader of the host vehicle (e.g. skid steer or tracked loader). A "dead-man" support (6) also coupled with the first boom (1) is configured to facilitate attachment to the loader.

A hydraulic cylinder (5), a helical cut shaft (13), a rotation guide pin (7), a rotation cylinder dynamic pin guide (17), a rotation pin (14), and rotation shaft internal and external retaining collars (15, 16) are configured to provide a rotation function for the saw head assembly. The saw head is supported by a mounting collar (9). A body pin (20) couples the hydraulic cylinder (5) with the second boom (2). A blade shield (8) and saw head motor housing (10) are coupled with the second boom (2).

Figure 2B:
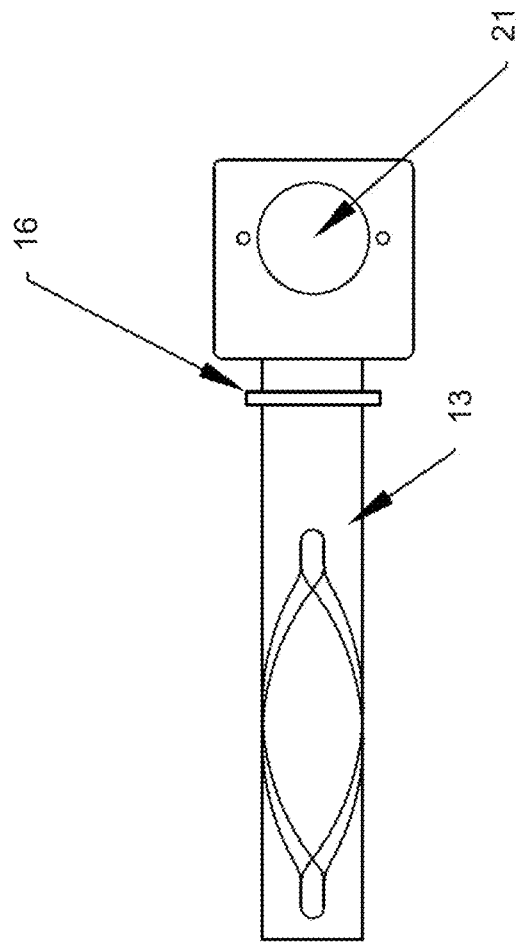

FIG. 2A and FIG. 2B depict mechanical diagrams 200A and 200B illustrating more detailed views of the rotation actuator section of FIG. 1 in accordance with embodiments of the present disclosure. Table II lists key components with label descriptors as referenced to FIG. 2.

TABLE II

| Label | Description |
|---|---|
| 20 | Rotation Cylinder Static Pin |
| 5 | Hydraulic Actuator |
| 14 | Rotation Cylinder Dynamic Pin |
| 13 | Rotation Shaft w/ Helical slot |
| 15 | Rotation Shaft Internal Retention Collar |
| 9 | Rotation Collar |
| 16 | Rotation Shaft External Retention Collar |
| 17 | Rotation Cylinder Dynamic Pin Guide |
| 2 | Second Boom Section |
| 7 | Rotation Guide Pin Bracket |
| 8 | Blade Shield |
| 10 | Saw Head Motor Housing |
| 21 | SAE "A" 2-Bolt Mounting in Blade Shield Bracket (8) |

Figure 3:
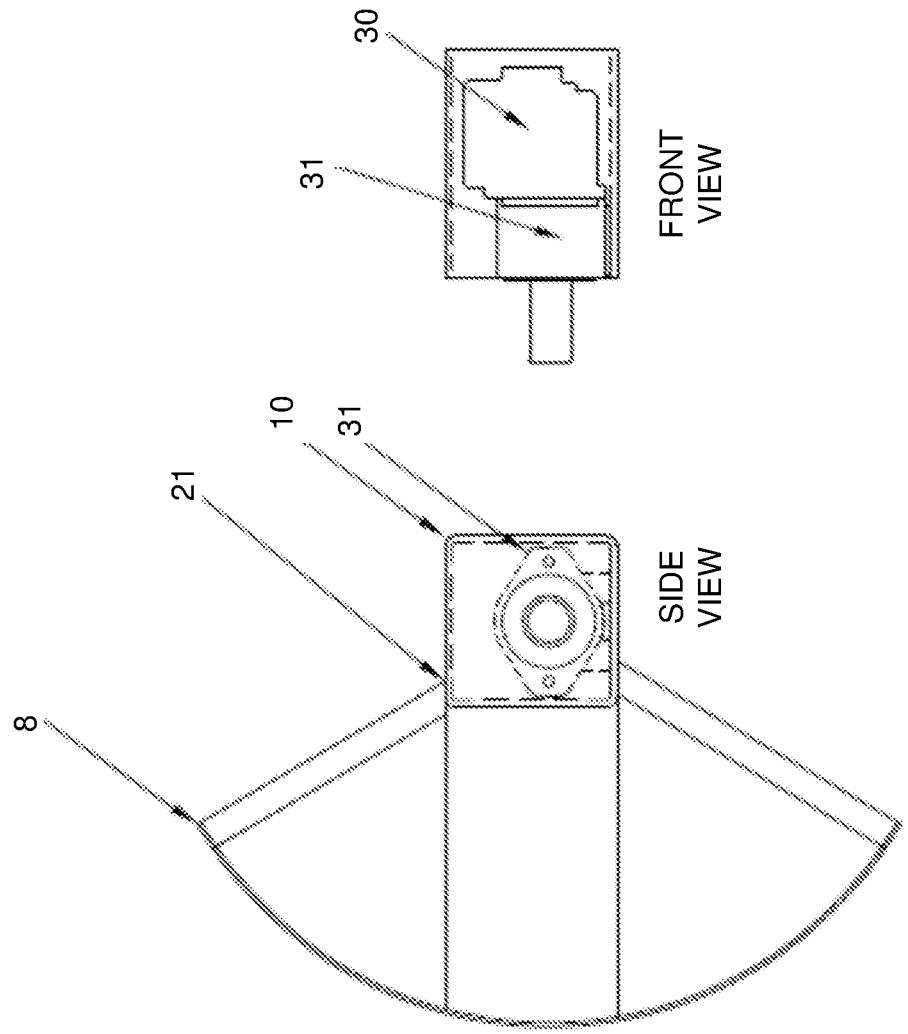
FIG. 3 depicts a mechanical diagram illustrating a more detailed view of a saw head assembly of FIG. 1 in accordance with embodiments of the present disclosure.

FIG. 3 depicts a mechanical diagram 300 illustrating a more detailed view of the saw head assembly of FIG. 1 in accordance with embodiments of the present disclosure. Table III lists key components with label descriptors as referenced to FIG. 1 in addition to the hydraulic motor and bearing/spindle assembly.

TABLE III

| Label | Description |
|---|---|
| 21 | SAE "A" 2-Bolt Mounting in Blade Shield Bracket (3) |
| 10 | Saw Head Motor Housing |
| 8 | Blade Shield |
| 30 | Hydraulic Motor |
| 31 | Bearing/Spindle Assembly |

Figure 4:
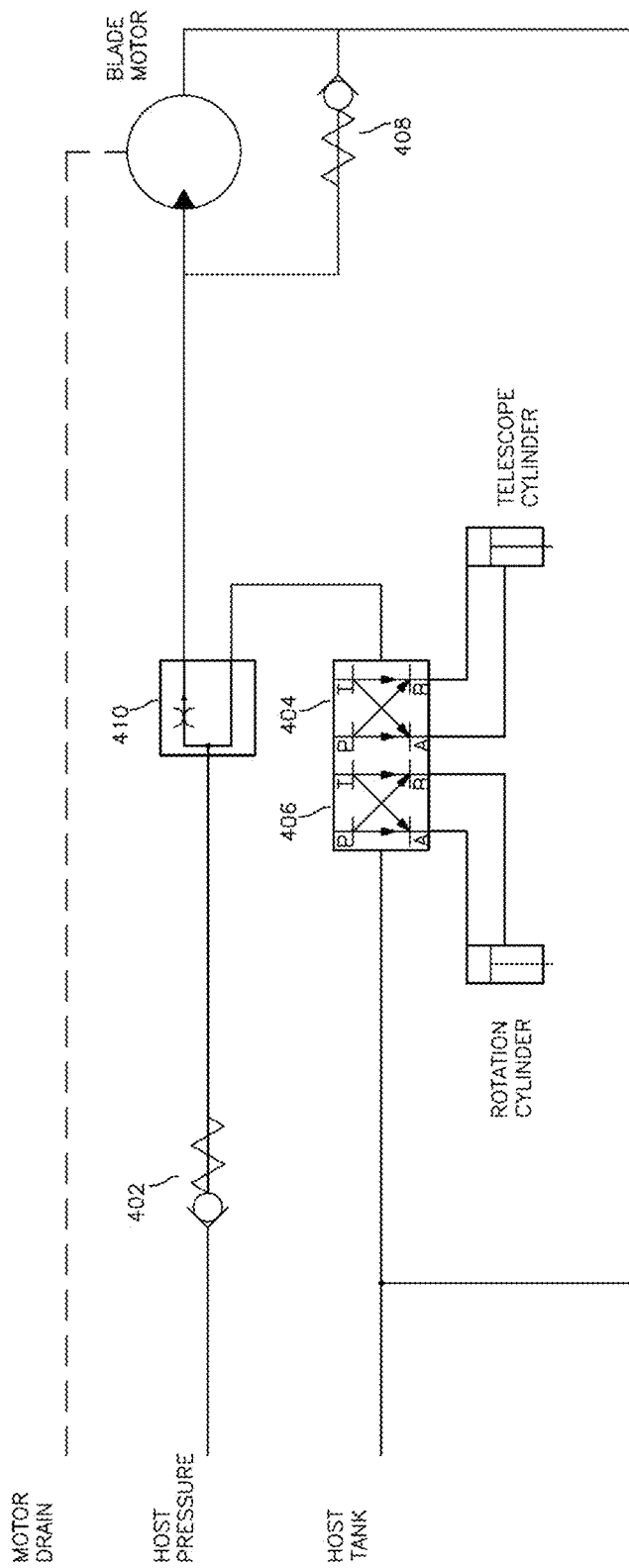
FIG. 4 depicts a hydraulic schematic illustrating hydraulic circuitry of FIG. 1 in accordance with embodiments of the present disclosure.

FIG. 4 depicts a hydraulic schematic 400 illustrating hydraulic circuitry of the first embodiment of FIG. 1 in accordance with embodiments of the present disclosure. A host pressure connection and a host tank connection are configured for attaching to the auxiliary hydraulic system of the host machine. The host pressure connection provides hydraulic fluid under pressure to a main check valve 402, parallel D03 solenoid valves 404 and 406, a motor check valve 408, and a priority flow control value 410. The host tank connection returns hydraulic fluid to the host machine. The main check valve 402 prevents backflow of hydraulic fluid into the host pressure connection. The parallel D03 solenoid valves 404 and 406 provide for control (expand and contract) of the telescoping hydraulic cylinder and the rotation hydraulic cylinder. The motor check valve 408 provides for motor free spool. The priority flow control value 410 provides for saw speed adjustment.

Figure 5:
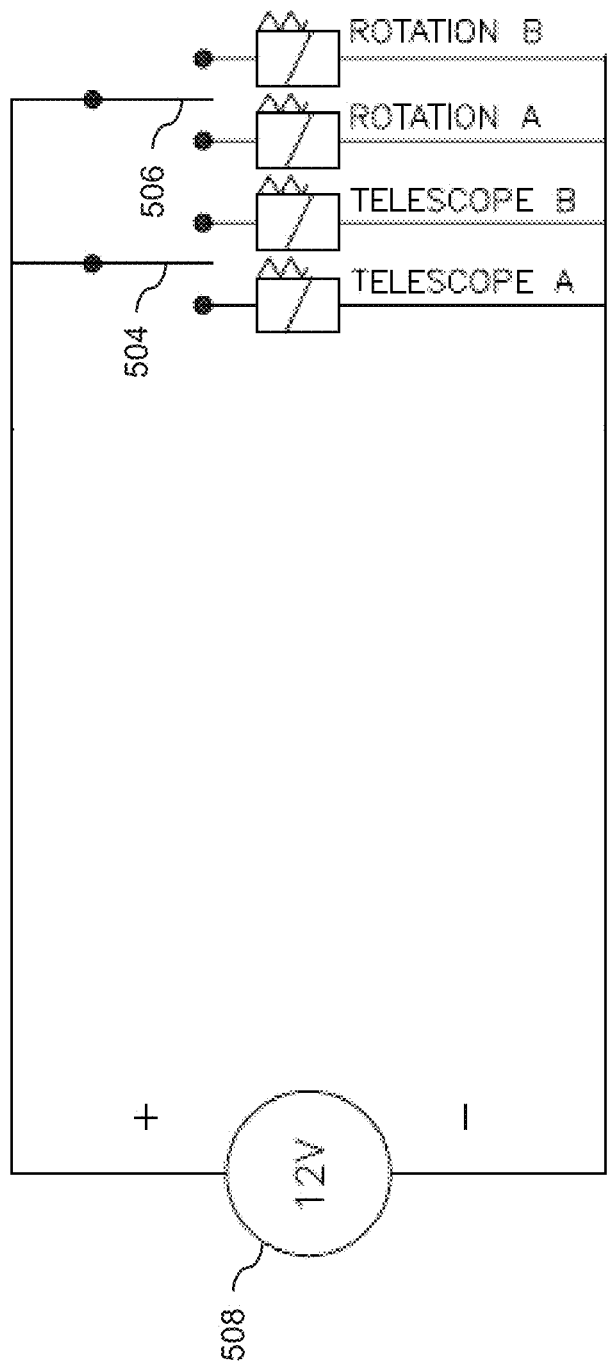
FIG. 5 depicts an electronic control schematic illustrating an electrical interconnect between an operator interface and the hydraulic circuitry of FIG. 4 in accordance with embodiments of the present disclosure.

FIG. 5 an electronic control schematic 500 illustrating the electrical interconnect between an operator interface and the hydraulic circuitry of FIG. 4 in accordance with embodiments of the present disclosure. A single pole double throw (SPDT) center off position switch 504 expands and retracts the boom telescope cylinder via hydraulic solenoid valve 404 of FIG. 4. A single pole double throw (SPDT) center off position switch 506 expands and retracts the head rotation cylinder via hydraulic solenoid valve 406 of FIG. 4. Power (i.e. 12 V) 508 is provided by the auxiliary power of the host machine.

Figure 6:
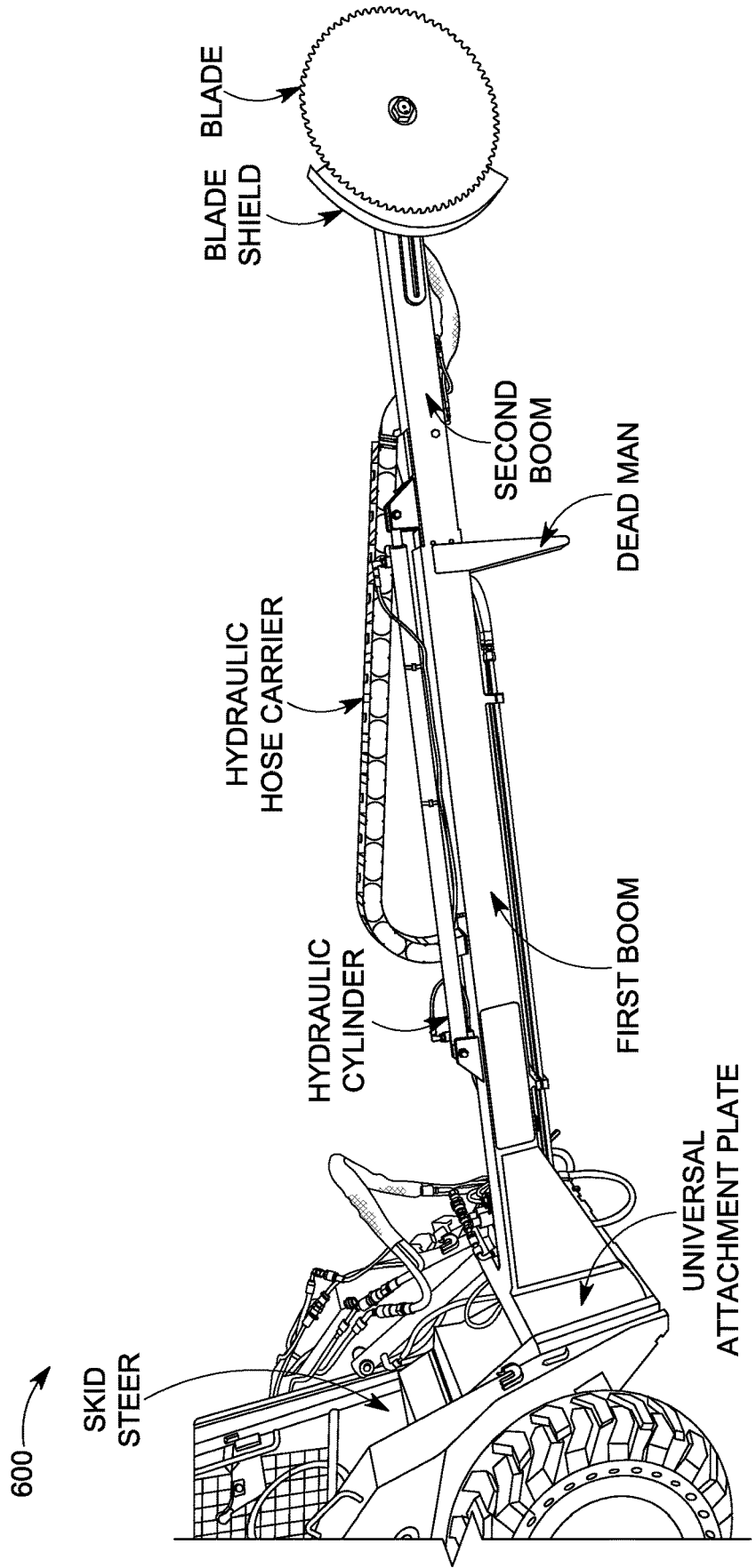
FIG. 6 depicts a diagram illustrating a side view of a saw attachment as described in FIG. 1 through FIG. 5 installed on a host vehicle (i.e. skid steer) in accordance with embodiments of the present disclosure.
Figure 7:
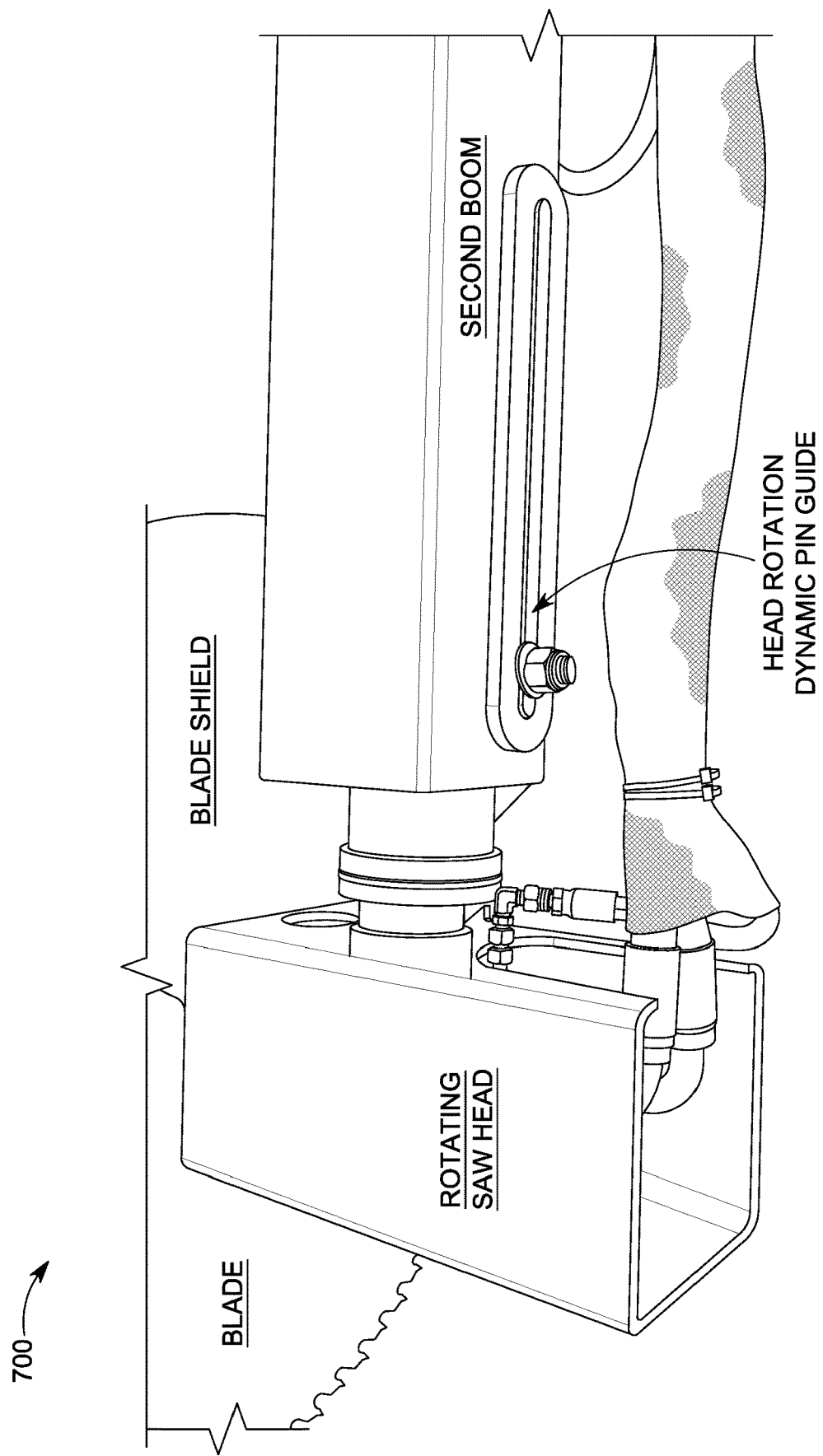
FIG. 7 depicts a diagram illustrating a forward view of the saw attachment of FIG. 6 showing more detail of a front section in accordance with embodiments of the present disclosure.

FIG. 6 depicts a diagram 600 illustrating a side view of a saw attachment (including a telescoping boom assembly) as described in FIG. 1 through FIG. 5 installed on a host vehicle (i.e. skid steer) in accordance with embodiments of the present disclosure. The diagram 600 further illustrates a universal attachment plate, first and second booms, a dead man, a hydraulic (telescoping) cylinder, a hydraulic hose carrier, a blade shield, and a 24 inch circular blade as previous described. As shown, the dead man supports the first and second boom, and protects the blade when the saw attachment is not in use. The telescoping boom assembly includes a six inch by 0.25 inch wall A500 square tube (i.e. first boom), a five inch by 0.25 inch wall A500 square tube (i.e. second boom), and a two inch by sixty inch stroke double acting hydraulic cylinder. The telescoping boom assembly also includes ultra-high molecular weight polyethylene (UHMW) polymer slide pads FIG. 7 depicts a diagram 700 illustrating a forward view of the saw attachment of FIG. 6 showing more detail of a front section in accordance with embodiments of the present disclosure. The diagram 700 further illustrates the blade, the blade shield, the second boom, a rotating saw head, and a head rotation dynamic pin guide as previously described. The rotation saw head achieves 180 degrees of rotation under hydraulic control of an operator of the host machine.

Figure 8:
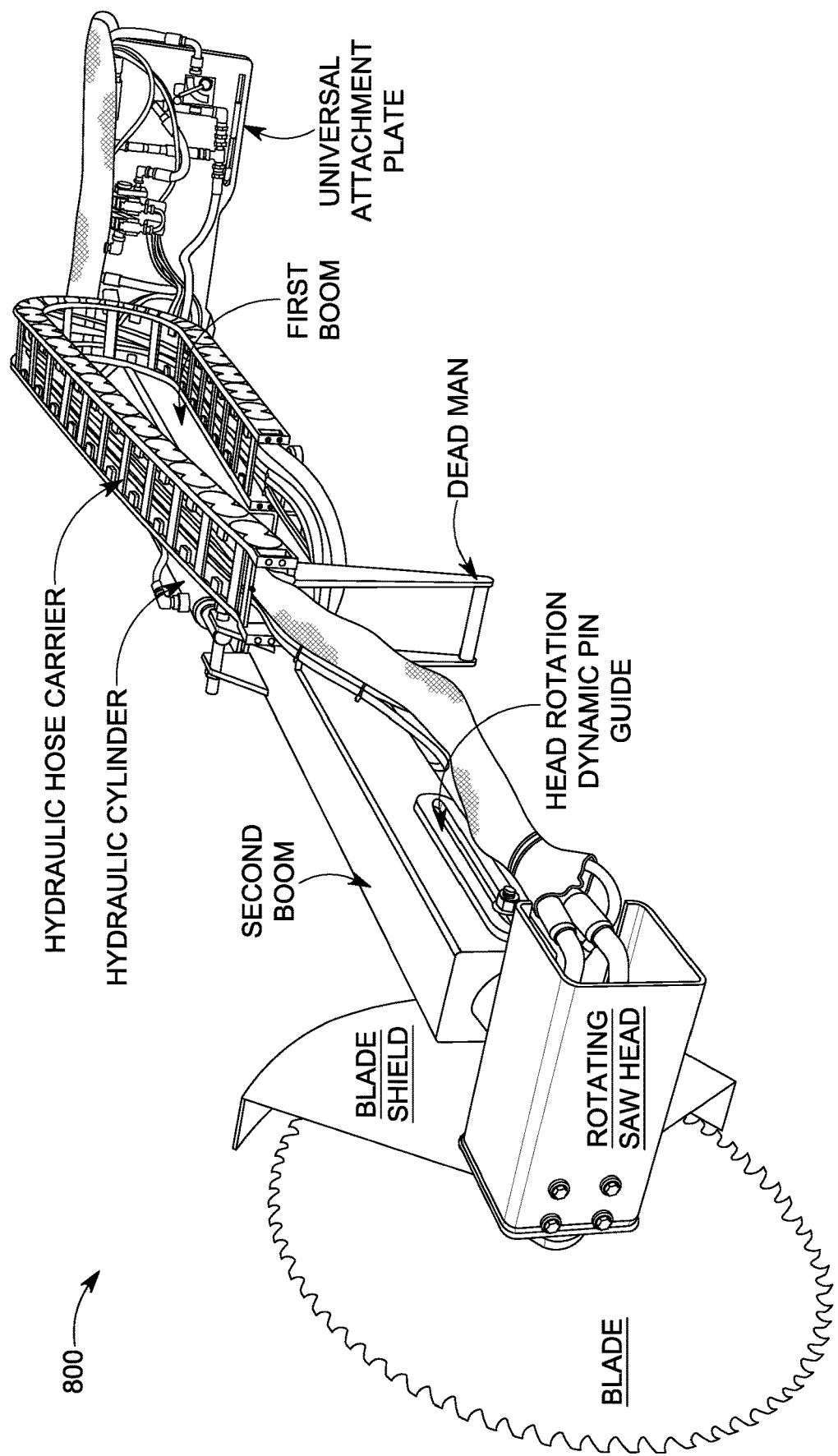
FIG. 8 depicts a diagram illustrating another view of the saw attachment of FIG. 6 in accordance with embodiments of the present disclosure.

FIG. 8 depicts a diagram 800 illustrating another view of the saw attachment of FIG. 6 in accordance with embodiments of the present disclosure. The diagram 800 further illustrates the blade, the blade shield, the first and second booms, the rotation saw head, the head rotation dynamic pin guide, the dead man, the hydraulic (telescoping) cylinder, the hydraulic hose carrier, and the universal attachment plate as previously described. The rotating saw head encases a high speed gerotor hydraulic motor.

Figure 9:
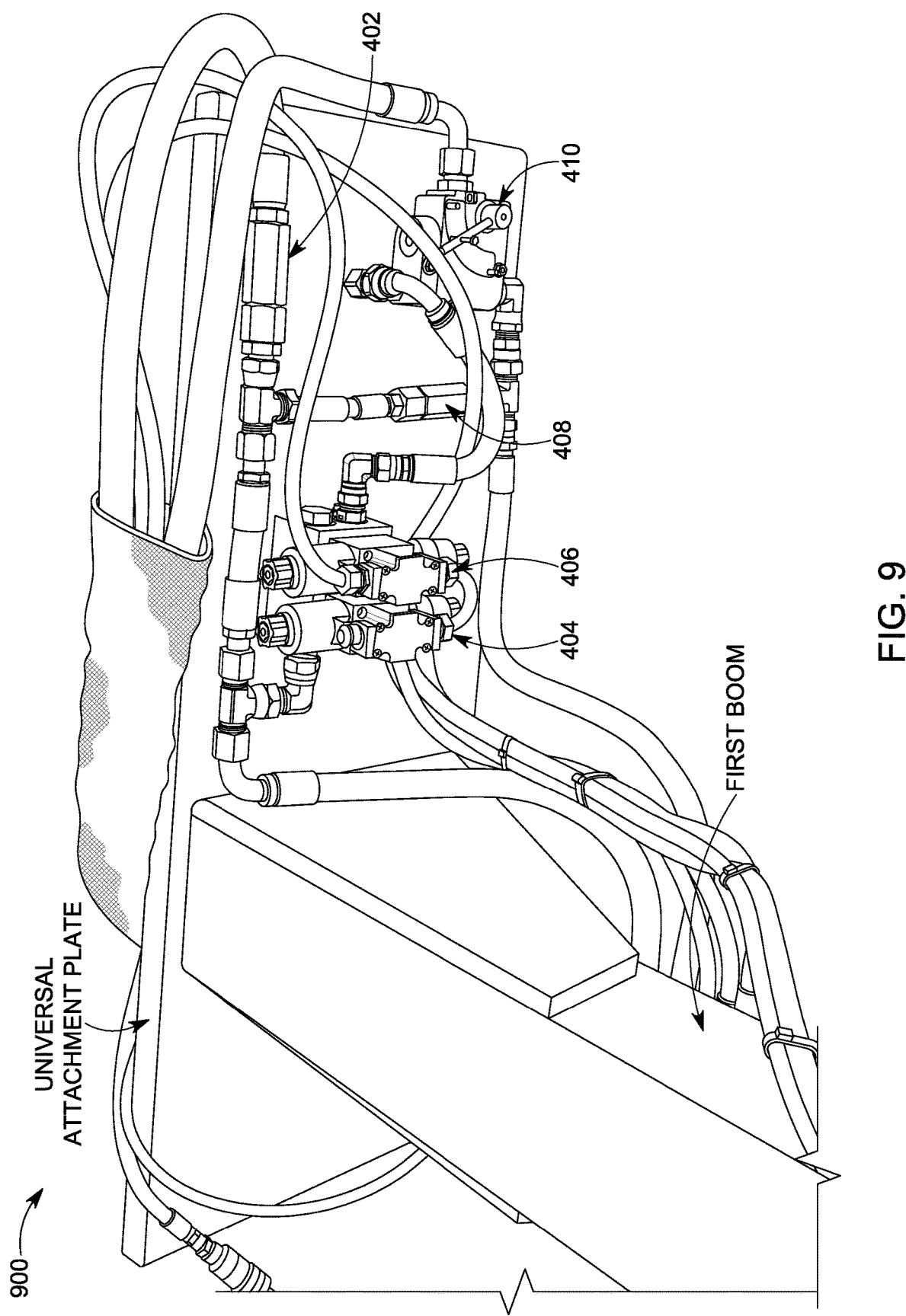
FIG. 9 depicts a diagram illustrating another view of the saw attachment of FIG. 6 showing more detail of a rear section of the saw attachment in accordance with embodiments of the present disclosure.

FIG. 9 depicts a diagram 900 illustrating another view of the saw attachment of FIG. 6 showing more detail of a rear section in accordance with embodiments of the present disclosure. The diagram 900 further illustrates, the universal attachment plate and the first boom as previously described.

The diagram 900 also illustrates examples of the main check valve 402, the parallel D03 solenoid valves 404 and 406, the motor check valve 408, and the priority flow control value 410 as described in FIG. 4.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A saw attachment for a host vehicle having an auxiliary hydraulic system, the saw attachment comprising:
   a universal attachment plate configured for attachment to a loader having lift arms, wherein the loader is resident on the host vehicle;
   a telescoping boom assembly coupled with the universal attachment plate, the telescoping boom assembly comprising:
      a first hydraulic cylinder configured to extend and retract the telescoping boom assembly using the auxiliary hydraulic system; and
      a second hydraulic cylinder;
   a saw head assembly rotatably coupled with the telescoping boom assembly, wherein:
      the second hydraulic cylinder is configured to provide a rotation of at least 120 degrees of the saw head assembly relative to an axis of the second hydraulic cylinder using the auxiliary hydraulic system; and
      the saw head assembly comprises:
         a motor housing; and
         a hydraulic motor positioned within the motor housing; and
   a circular saw blade coupled with the saw head assembly, wherein the hydraulic motor is configured to rotate the circular saw blade using the auxiliary hydraulic system.

2. The saw attachment of claim 1, wherein the saw attachment is configured for a forward reach between twelve feet and eighteen feet via the telescoping boom assembly.

3. The saw attachment of claim 2, wherein the saw attachment is configured for a vertical reach of at least eighteen feet via the telescoping boom assembly.

4. The saw attachment of claim 1, wherein the circular saw blade has a diameter of approximately 24 inches.

5. The saw attachment of claim 4, wherein the circular saw blade is configured for a cutting capacity of approximated 8 inches.

6. The saw attachment of claim 1, wherein the circular saw blade is coupled with the saw head assembly using a keyed shaft and hub assembly secured by a tabbed and keyed lock washer and retaining nut.

7. The saw attachment of claim 1, wherein the circular saw blade is coupled with the saw head assembly using an arbor nut and a clamping washer.

8. The saw attachment of claim 1, wherein the saw head assembly is further configured for rotating the circular saw blade at a rate of at least 3000 revolutions-per-minute (rpm).

9. The saw attachment of claim 1, wherein the telescoping boom assembly further comprises a helically grooved cylinder coupled between the second hydraulic cylinder and the saw head assembly to provide the rotation of at least 120 degrees of the saw head assembly.

10. The saw attachment of claim 9, wherein the saw head assembly is configured to be manually clocked at least 340 degrees relative to the telescoping boom assembly in addition to the rotation of at least 120 degrees of the saw head assembly provided by the second hydraulic cylinder.

11. The saw attachment of claim 10 further comprising:
an operator interface configured for mounting in the host vehicle;
a priority flow diverter valve and solenoid directional control valves electrically coupled with the operator interface and hydraulically coupled with a first quick connect coupling assembly, wherein the first quick connect coupling assembly is configured for connection to an output port of a hydraulic system of the host vehicle;
a priority flow divider hydraulic valve configured for controlling flow output supplying regulated flow to the hydraulic motor;
a first directional control valve electrically coupled with the operator interface and hydraulically coupled with:
an excess flow output port of the priority flow diverter valve;
a first port of the first hydraulic cylinder; and
a second port of the first hydraulic cylinder;
a second directional control valve electrically coupled with the operator interface and hydraulically coupled with:
an excess flow output port of the priority flow diverter valve;
a first port of the second hydraulic cylinder; and
a second port of the second hydraulic cylinder; and
a third directional control valve electrically coupled with operator interface and hydraulically coupled with:
a first port of the second hydraulic cylinder; and
a second port of the second hydraulic cylinder.

12. The saw attachment of claim 1, wherein the universal attachment plate is configured for direct mechanical mounting to the loader.

13. The saw attachment of claim 12, wherein the universal attachment plate is compliant to at least one version of the Society of Automotive Engineers (SAE) J2513 standard.

14. A method of manufacturing a saw attachment, the method comprising:
assembling a telescoping boom assembly with a saw head assembly;
assembling a circular saw blade with the saw head assembly; and
assembling a universal attachment plate with the telescoping boom assembly, wherein the universal attachment plate is configured for attachment to a loader having lift arms and resident on a host vehicle having an auxiliary hydraulic system, wherein:
the telescoping boom assembly comprises:
a first hydraulic cylinder configured to extend and retract the telescoping boom assembly using the auxiliary hydraulic system; and
a second hydraulic cylinder configured to provide a rotation of at least 120 degrees of the saw head assembly relative to an axis of the second hydraulic cylinder using the auxiliary hydraulic system; and
the saw head assembly comprises:
a motor housing; and
a hydraulic motor configured to rotate the circular saw blade using the auxiliary hydraulic system.

15. A method of trimming a tree, the method comprising:
installing a saw attachment having an operator interface on to a loader of a host vehicle having an auxiliary hydraulic system, the saw attachment comprising:
a universal attachment plate configured for attachment to the loader;
a telescoping boom assembly coupled with the universal attachment plate, the telescoping boom assembly comprising:
a first hydraulic cylinder configured to extend and retract the telescoping boom assembly using the auxiliary hydraulic system; and
a second hydraulic cylinder;
a saw head assembly rotatably coupled with the telescoping boom assembly, wherein:
the second hydraulic cylinder is configured to provide a rotation of at least 120 degrees of the saw head assembly relative to an axis of the second hydraulic cylinder using the auxiliary hydraulic system; and
the saw head assembly comprises:
a motor housing; and
a hydraulic motor positioned within the motor housing; and
a circular saw blade coupled with the saw head assembly, wherein the hydraulic motor is configured to rotate the circular saw blade using the auxiliary hydraulic system; and
operating the saw attachment from within the host vehicle using the operator interface.

16. The method of claim 15, wherein the host vehicle is at least one of a skid-steer, and a tracked loader.

* * * * *